US012659595B2

(12) United States Patent
Xu

(10) Patent No.: US 12,659,595 B2
(45) Date of Patent: Jun. 16, 2026

(54) METHOD AND APPARATUS FOR DETERMINING EXPOSURE PARAMETER

(71) Applicant: Honor Device Co., Ltd., Shenzhen (CN)

(72) Inventor: Jirun Xu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 110 days.

(21) Appl. No.: 18/692,589

(22) PCT Filed: Apr. 13, 2023

(86) PCT No.: PCT/CN2023/088149
§ 371 (c)(1),
(2) Date: Mar. 15, 2024

(87) PCT Pub. No.: WO2023/226612
PCT Pub. Date: Nov. 30, 2023

(65) Prior Publication Data
US 2025/0133297 A1     Apr. 24, 2025

(30) Foreign Application Priority Data

May 27, 2022    (CN) .......................... 202210590121.0
Aug. 18, 2022   (CN) .......................... 202210993849.8

(51) Int. Cl.
H04N 23/73 (2023.01)
H04N 23/72 (2023.01)
(Continued)

(52) U.S. Cl.
CPC ............. H04N 23/73 (2023.01); H04N 23/72 (2023.01); H04N 23/745 (2023.01); H04N 23/75 (2023.01); H04N 23/76 (2023.01)

(58) Field of Classification Search
CPC ........ H04N 23/73; H04N 23/72; H04N 23/70; H04N 23/76; H04N 23/745; H04N 23/71; H04N 23/75
See application file for complete search history.

(56) References Cited

U.S. PATENT DOCUMENTS 11,818,497 B2   11/2023  Li et al.
2007/0166020 A1*  7/2007  Quan ..................... H04N 23/73
                                         348/E5.037
(Continued)

FOREIGN PATENT DOCUMENTS

CN      103945119 A    7/2014
CN      106657806 A    5/2017
(Continued)

*Primary Examiner* — Lin Ye
*Assistant Examiner* — Steven Daniel Barry
(74) *Attorney, Agent, or Firm* — Slater Matsil, LLP

(57) ABSTRACT

Embodiments of this application relate to the terminal field, and provide a method and an apparatus for determining an exposure parameter. The method is applied to an electronic device, and includes: identifying a current shooting scenario, and determining at least one camera lens corresponding to the current shooting scenario, the first camera lens is corresponding to a first exposure meter, and the first exposure meter is preset; adjusting the first exposure meter based on a first parameter, to obtain a second exposure meter, where the first parameter includes at least one of a minimum frame rate in the current shooting scenario, photosensitivity of the first camera lens, and a flicker frequency of an ambient light source; and determining an exposure parameter of the first camera lens based on the second exposure meter, and controlling, based on the exposure parameter, the first camera lens to acquire image data.

20 Claims, 7 Drawing Sheets

(51) Int. Cl.
     *H04N 23/745*         (2023.01)
     *H04N 23/75*          (2023.01)
     *H04N 23/76*          (2023.01)

(56)                References Cited

U.S. PATENT DOCUMENTS

| | | | |
|---|---|---|---|
| 2010/0134650 A1* | 6/2010 | Kim ........................ | H04N 23/72 |
| | | | 348/229.1 |
| 2017/0126951 A1* | 5/2017 | Li ......................... | H04N 23/617 |
| 2017/0237963 A1* | 8/2017 | Cook ................... | H04N 13/271 |
| | | | 348/49 |
| 2020/0348580 A1 | 11/2020 | Pan et al. | |
| 2022/0141443 A1* | 5/2022 | Lee .......................... | G09G 3/32 |
| | | | 348/51 |

FOREIGN PATENT DOCUMENTS

| | | | | |
|---|---|---|---|---|
| CN | 108702459 A | | 10/2018 | |
| CN | 109951647 A | | 6/2019 | |
| CN | 111083384 A | | 4/2020 | |
| CN | 113411528 A | | 9/2021 | |
| CN | 114095666 A | | 2/2022 | |
| CN | 114520880 A | * | 6/2022 | ............. H04N 23/73 |
| JP | 2013051592 A | | 3/2013 | |
| JP | 2017139636 A | | 8/2017 | |
| WO | WO-2021184239 A1 | * | 9/2021 | ........... H04N 23/676 |

* cited by examiner

Electronic device 100

METHOD AND APPARATUS FOR DETERMINING EXPOSURE PARAMETER

CROSS-REFERENCE TO RELATED APPLICATIONS

This application is a national stage of International Application No. PCT/CN2023/088149, filed on Apr. 13, 2023, which claims priority to Chinese Patent Application No. 202210590121.0, filed on May 27, 2022, and Chinese Patent Application No. 202210993849.8, filed on Aug. 18, 2022. The disclosures of each of the aforementioned applications are hereby incorporated by reference in their entireties.

TECHNICAL FIELD

This application relates to the terminal field, and in particular to a method and an apparatus for determining an exposure parameter.

BACKGROUND

Auto exposure (auto exposure, AE) is a mechanism that automatically adjusts an exposure parameter (for example, an exposure time and an exposure gain (or a camera lens) based on a brightness value (which is affected by strength of external light) of an image, to prevent overexposure or underexposure of the camera. It should be understood that if the exposure time of the camera is longer, the grain is higher, and brightness of the image is higher. Because human eyes are very sensitive to the brightness of the image, if the image is quite dark or bright, user experience is seriously affected. Therefore, imaging quality of the camera is closely related to the exposure parameter of the camera. Only an appropriate exposure parameter may ensure quality of the image.

The exposure parameter is related to an exposure meter configured by a picture quality engineer (picture quality engineer, PQ). However, at present, the exposure meter is manually configured by the PQ and cannot be flexibly adjusted based on an actual situation. Consequently, problems of a low frame rate of the camera, screen flickering, brightness mismatching, and the like may be caused.

SUMMARY

Embodiments of this application provide a method and an apparatus for determining an exposure parameter, to intelligently configure an exposure meter, and obtain a more accurate exposure parameter based on the intelligently configured exposure meter. Therefore, imaging quality is improved.

According to a first aspect, an embodiment of this application provides a method for determining an exposure parameter. The method for determining an exposure parameter is applied to an electronic device, and the electronic device includes a plurality of camera lenses. The method includes: identifying a current shooting scenario, and determining at least one camera lens corresponding to the current shooting scenario, where the at least one camera lens includes a first camera lens, the first camera lens is corresponding to a first exposure meter, and the first exposure meter is preset; adjusting the first exposure meter based on a first parameter, to obtain a second exposure meter, where the first parameter includes at least one of a minimum frame rate in the current shooting scenario, photosensitivity of the first camera lens, and a flicker frequency of an ambient light source; and determining an exposure parameter of the first camera lens based on the second exposure meter, and controlling, based on the exposure parameter, the first camera lens to acquire image data, where the exposure parameter includes an exposure time and an exposure gain.

Based on the method provided in this embodiment of this application, an initial exposure meter (the first exposure meter) corresponding to a camera lens (for example, the first camera lens) in the current shooting scenario may be corrected. Specifically, if the first exposure meter may be corrected based on the at least one of the minimum frame rate in the current shooting scenario, the photosensitivity of the first camera lens, and the flicker frequency of the ambient light source, to obtain the second exposure meter. If the first exposure meter is corrected based on the minimum frame rate in the current shooting scenario, a problem that a frame rate is low can be resolved. If the first exposure meter is corrected based on the flicker frequency of the ambient light source, screen flickering can be avoided. If the first exposure meter is corrected based on the photosensitivity of the first camera lens, a debugging interval of the first exposure meter is not reduced, and consistency of brightness can be ensured.

In a possible implementation, when the first parameter includes the minimum frame rate in the current shooting scenario, the photosensitivity of the first camera lens, and the flicker frequency of the ambient light source, the adjusting the first exposure meter based on a first parameter, to obtain a second exposure meter includes: updating a maximum exposure time in the first exposure meter to $1/Z$ based on a minimum frame rate $Z$ in the current shooting scenario, to obtain a third exposure meter; modifying all exposure times in the third exposure meter to an integer multiple of the flicker frequency of the ambient light source based on the flicker frequency of the ambient light source, to obtain a fourth exposure meter; and adding a group of pieces of exposure data to the fourth exposure meter, to obtain the second exposure meter, where the added group of pieces of exposure data includes at least one of a maximum exposure time, a minimum exposure time, a maximum exposure gain, and a minimum exposure gain, where the minimum exposure time is the same as an exposure time with a maximum value in the fourth exposure meter, and the maximum exposure time is $1/$frame rate; and the minimum exposure gain is the same as an exposure gain with a maximum value in the fourth exposure meter, and the maximum exposure gain is determined based on a maximum exposure gain corresponding to the first camera lens, the exposure gain with a maximum value in the fourth exposure meter, current photosensitivity of the first camera lens, and maximum photosensitivity of the first camera lens.

It should be understood that, first, the maximum exposure time in the first exposure meter is updated to $1/Z$ based on the minimum frame rate $Z$ in the current shooting scenario, to obtain the third exposure meter, where $Z$ represents the minimum frame rate in the current shooting scenario, to enable the maximum exposure time in the third exposure meter to be less than or equal to $1/Z$. This resolves the problem that a frame rate is low. In addition, the all exposure times in the third exposure meter are modified to an integer multiple of the flicker frequency of the ambient light source based on the flicker frequency of the ambient light source, to obtain the fourth exposure meter, and enable the all exposure times in the fourth exposure meter to be updated to an integer multiple of a frequency of a flicker light source. Therefore, the screen flickering is avoided. Finally, the group of pieces of exposure data is added to the fourth exposure meter, to obtain the second exposure meter. Compared to the debugging interval of the first exposure meter, a debugging interval (a gain interval and an exposure time interval) of the second exposure meter is not smaller (unchanged or larger), and the consistency of the brightness can be ensured.

In a possible implementation, maxISO=min (maxISOOrg, (now_binSumRatio/max_binSumRatio)*X), where maxISO represents the maximum exposure gain in the added group of pieces of exposure data, maxISOOrg represents the maximum exposure gain of the first camera lens, now_binSumRatio represents photosensitivity of the first camera lens in the current shooting scenario, max_binSumRatio represents the maximum photosensitivity of the first camera lens, and X represents the exposure gain with a maximum value in the fourth exposure meter. To be specific, the maximum exposure gain of the added group of pieces of exposure data may be flexibly changed based on the photosensitivity of the first camera lens in the current shooting scenario, that is, the corrected exposure meter (the second exposure meter) is more applicable to a scenario in which the photosensitivity is changed. In addition, the maximum exposure gain of the added group of pieces of exposure data does not exceed the maximum exposure gain of the first camera lens. This avoids an anomaly, and meets a debugging requirement of a PQ.

In a possible implementation, the determining an exposure parameter of the first camera lens based on the second exposure meter includes: when the photosensitivity of the first camera lens is changed, querying the second exposure meter based on a product of the changed photosensitivity and exposure, to obtain the exposure parameter of the first camera lens. In this application, when the photosensitivity is changed because the camera lens is switched to a sensor mode, a difference in photosensitivity may be synchronized by the exposure, the changed (altered) photosensitivity is multiplied by the exposure, and the corrected exposure meter (the second exposure meter) is queried based on a product (that is, a product of the new photosensitivity and exposure output from an exposure decision-making module). The corrected exposure meter does not change raw data of an initial exposure meter (especially a gain is unchanged). Only a group of data is added, and the debugging interval of the exposure meter is not smaller (unchanged or larger). In addition, the corrected exposure meter does not affect an exposure time and an exposure gain in a high brightness scenario. In a low-brightness scenario, to ensure the consistency of the brightness, although an increase in a gain causes an increase in noise, the noise may be reduced by debugging.

In a possible implementation, an exposure meter corresponding to the first camera lens is established based on the maximum photosensitivity of the first camera lens. In this way, the exposure meter established based on the maximum photosensitivity may synchronize an exposure parameter of the camera lens at different photosensitivity. Therefore, the exposure meter may be set based on the different photosensitivity of the camera lens. This simplifies work of the PQ.

In a possible implementation, when the first parameter includes the minimum frame rate in the current shooting scenario, the adjusting the first exposure meter based on a first parameter, to obtain a second exposure meter includes: updating a maximum exposure time in the first exposure meter to 1/Z based on a minimum frame rate Z in the current shooting scenario, to obtain the second exposure meter. In this way, the maximum exposure time in the first exposure meter is updated to 1/Z based on the minimum frame rate Z in the current shooting scenario, to obtain the second exposure meter, where Z represents the minimum frame rate in the current shooting scenario, to enable the maximum exposure time in the second exposure meter to be less than or equal to 1/Z. This resolves the problem that a frame rate is low.

In a possible implementation, when the first parameter includes the flicker frequency of the ambient light source, the adjusting the first exposure meter based on a first parameter, to obtain a second exposure meter includes: modifying all exposure times in the first exposure meter to an integer multiple of the flicker frequency of the ambient light source based on the flicker frequency of the ambient light source, to obtain the second exposure meter. In this way, the all exposure times in the first exposure meter are modified to the integer multiple of the flicker frequency of the ambient light source based on the flicker frequency of the ambient light source, to obtain the second exposure meter, and enable the all exposure times in the second exposure meter to be updated to an integer multiple of a frequency of a flicker light source. Therefore, the screen flickering is avoided.

In a possible implementation, when the first parameter includes the photosensitivity of the first camera lens, the adjusting the first exposure meter based on a first parameter, to obtain a second exposure meter includes: adding a group of pieces of exposure data to the second exposure meter based on the photosensitivity of the first camera lens, where the added group of pieces of exposure data includes at least one of a maximum exposure time, a minimum exposure time, a maximum exposure gain, and a minimum exposure gain; the minimum exposure time is the same as an exposure time with a maximum value in the first exposure meter, and the maximum exposure time is 1/frame rate; and the minimum exposure gain is the same as an exposure gain with a maximum value in the first exposure meter, and the maximum exposure gain is determined based on a maximum exposure gain corresponding to the first camera lens, the exposure gain with a maximum value in the first exposure meter, current photosensitivity of the first camera lens, and maximum photosensitivity of the first camera lens. In this way, the group of pieces of exposure data is added to the fourth exposure meter, to obtain the second exposure meter. Compared to the debugging interval of the first exposure meter, the debugging interval (a gain interval and an exposure time interval) of the second exposure meter is not smaller (unchanged or larger), and the consistency of the brightness can be ensured.

According to a second aspect, this application provides a chip system. The chip system includes one or more interface circuits and one or more processors. The interface circuit and the processor are interconnected through a line. The chip system is applied to an electronic device including a communication module and a memory. The interface circuit is configured to receive a signal from the memory of the electronic device and send the received signal to the processor. The signal includes computer instructions stored in the memory. When the processor executes the computer instructions, the electronic device performs the method according to any one of the first aspect and the possible designs of the first aspect.

According to a third aspect, this application provides a computer-readable storage medium. The computer-readable storage medium includes computer instructions. When the computer instructions are run on an electronic device (for example, a mobile phone), the electronic device is enabled to perform the method according to any one of the first aspect and the possible designs of the first aspect.

According to a fourth aspect, an embodiment of this application provides an apparatus for determining an exposure parameter. The apparatus includes a processor. The processor is coupled to a memory, and the memory stores program instructions. When the program instructions stored in the memory are executed by the processor, the apparatus is enabled to perform the method according to any one of the first aspect and the possible designs of the first aspect. The apparatus may be an electronic device or a server device, or may be a component of an electronic device or a server device, such as a chip.

According to a fifth aspect, an embodiment of this application provides an apparatus for determining an exposure parameter. The apparatus may be divided into different logical units or modules based on functions, and each unit or module performs different functions, to enable the apparatus to perform the method according to any one of the first aspect and the possible designs of the first aspect.

According to a sixth aspect, this application provides a computer program product. When the computer program product is run on a computer, the computer is enabled to perform the method according to the first aspect and any possible design of the first aspect.

It may be understood that, for beneficial effects that can be achieved by the chip system according to the second aspect, the computer-readable storage medium according to the third aspect, the computer program product according to the fourth aspect, and the apparatus according to the fifth and sixth aspect provided above, refer to the beneficial effects in any one of the first aspect and the possible designs of the first aspect. Details are not described herein.

DETAILED DESCRIPTION OF ILLUSTRATIVE EMBODIMENTS

Figure 1:
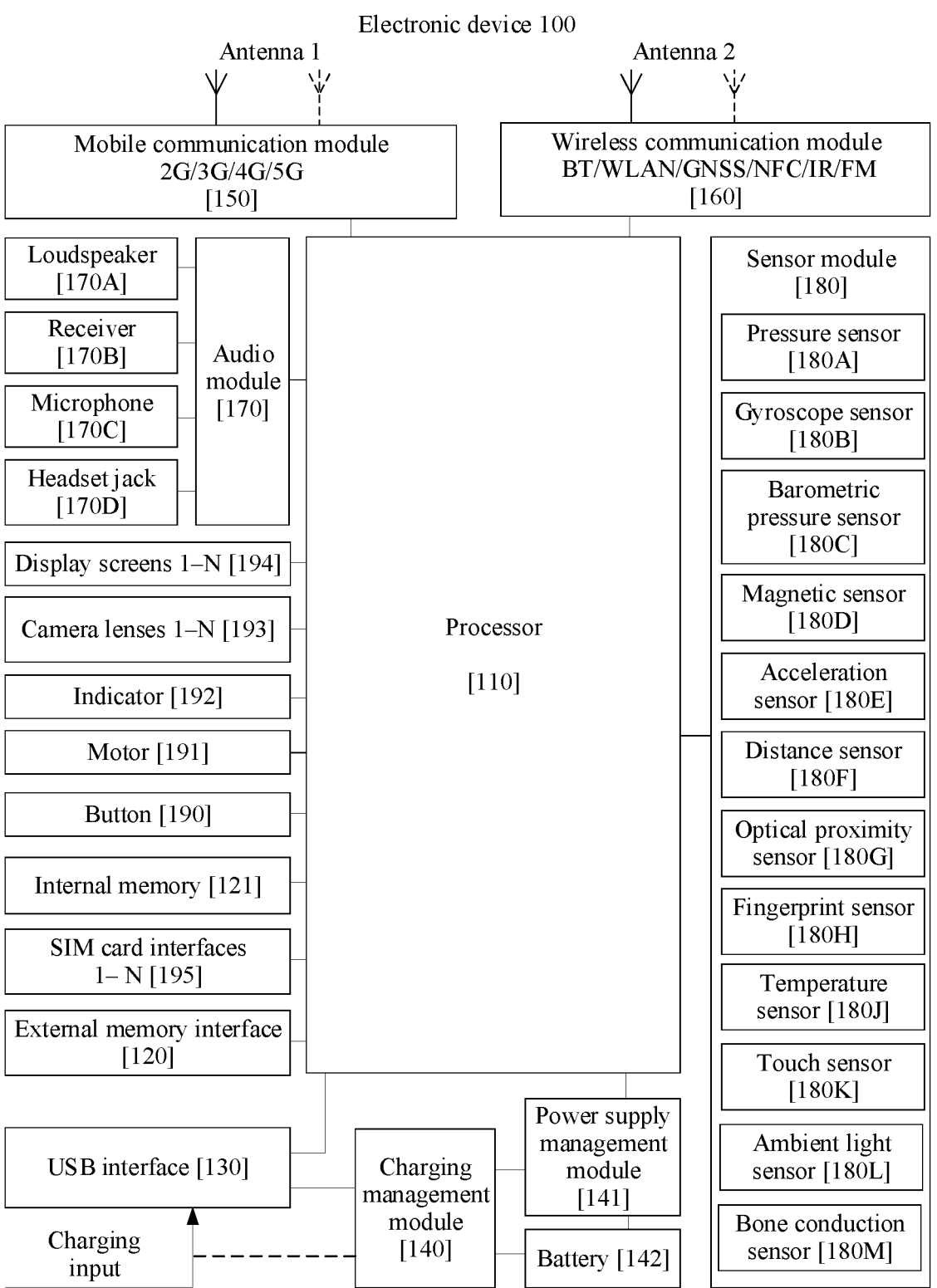
FIG. 1 is a schematic structural diagram of the electronic device according to an embodiment of this application.

For clarity and brevity of description of the following embodiments and for ease of understanding by a person skilled in the art, related concepts or technologies are briefly described first.

Exposure (exposure): a key factor of a camera, determined by factors such as a size of an aperture (aperture), an exposure time, and photosensitivity (binsumratio).

Aperture: The aperture is configured to control light into a lens. If the aperture is larger, luminous flux of the lens per unit time is larger. If the aperture is smaller, luminous flux of the lens per unit time is smaller.

Exposure time: is also a speed of a shutter (shutter). If an exposure time is longer, luminous flux of a lens per unit time is larger. If an exposure time is shorter, luminous flux of a lens per unit time is smaller.

ISO: may be photosensitivity (sensitivity to light), or may be a photosensitivity measurement standard specifically formulated by the International Standard Organization (International Standard Organization). An ISO of a digital camera is implemented by adjusting sensitivity of a photosensitive device or combining photosensitive points. To be specific, the ISO is improved by improving sensitivity to light of the photosensitive device or combining several adjacent photosensitive points. The photosensitivity determines a light amount required for shooting a photo and a time required for opening a shutter. A lower ISO means that the photosensitive device requires a longer exposure time or a larger light amount to shoot a photo. On the contrary, a higher ISO means that the photosensitive element requires a smaller light amount or a shorter exposure time.

Exposure gain (gain): is referred to as a gain in embodiments of this application. The gain is related to photosensitivity. A high gain represents high sensitivity, and is more sensitive to low light. In a process of amplifying an image signal, a noise signal is also amplified. Therefore, a gain of an amplifier is usually set to a minimum gain. The gain may be increased when ambient light is dark, the image signal is weak, and the exposure time is not intended to be increased. Generally, a gain provided by the digital camera may range from 1,000 to 128,000.

Shooting scenario: In embodiments of this application, the shooting scenario may include scenarios in which an electronic device performs shooting (photo shooting or video recording) in different shooting modes after a camera application is opened, and a shooting scenario in which another application invokes the camera application to perform shooting. The scenarios in which an electronic device performs shooting in different shooting modes after a camera application is opened may include a scenario in which the electronic device is in a multi-lens shooting mode and a scenario in which the electronic device is in a single-lens shooting mode.

The multi-lens shooting mode is a mode in which the electronic device performs shooting by using a plurality of camera lenses. When the electronic device is in the multi-lens shooting mode, a display screen simultaneously displays, in a shooting preview interface, images respectively shot by a plurality of camera lenses, and images shot by different camera lenses may be displayed through splicing or in a picture-in-picture manner. Based on a type of camera lens used by the electronic device and a display manner of images shot by different camera lenses, the multi-lens shooting mode may include a front-facing/rear-facing shooting sub-mode, a rear-facing/rear-facing shooting sub-mode, a picture-in-picture shooting sub-mode, a single front-facing shooting sub-mode (a single front-facing mode for short), a single rear-facing shooting sub-mode, and the like. In embodiments of this application, the multi-lens shooting mode may include multi-lens video recording and multi-lens photo shooting.

The front-facing/rear-facing shooting mode is a mode in which the electronic device may simultaneously perform shooting by using a front-facing camera lens and a rear-facing camera lens. When in the front-facing/rear-facing shooting mode, the electronic device may simultaneously display, in the shooting preview interface, images (such as a first image and a second image) shot by the front-facing camera lens and the rear-facing camera lens, and display the first image and the second image through splicing. When the electronic device is vertically placed, the first image and the second image may be spliced up and down. When the electronic device is horizontally placed, the first image and the second image may be spliced left and right. By default, a display area of the first image is consistent with a display area of the second image.

The rear-facing/rear-facing camera shooting mode is a mode in which the electronic device may simultaneously perform shooting by using two rear-facing camera lenses (if there are a plurality of rear-facing camera lenses). When the electronic device is in the rear-facing/rear-facing camera shooting mode, the electronic device may simultaneously display, in the shooting preview interface, images (such as a first image and a second image) shot by two rear-facing camera lenses, and display the first image and the second image through splicing. When the electronic device is vertically placed, the first image and the second image may be spliced up and down. When the electronic device is horizontally placed, the first image and the second image may be spliced left and right.

The picture-in-picture shooting mode is a mode in which the electronic device may simultaneously perform shooting by using two camera lenses. When being in the picture-in-picture shooting mode, the electronic device may simultaneously display, in the shooting preview interface, images (such as a first image and a second image) shot by the two camera lenses. The second image is displayed in an entire region of the shooting preview interface, the first image is superimposed on the second image, and a display area of the first image is smaller than a display area of the second image. By default, the first image may be located at the lower left of the second image. The foregoing two camera lenses may be freely combined, for example, may be two front-facing camera lenses, two rear-facing camera lenses, or one front-facing camera lens and one rear-facing camera lens.

The single front-facing shooting mode is a mode in which the electronic device performs shooting by using a front-facing camera lens. The single rear-facing shooting mode is a mode in which the electronic device performs shooting by using a rear-facing camera lens. A difference between a normal front-facing shooting mode and a normal rear-facing shooting mode is that, in the single front-facing shooting sub-mode and the single rear-facing shooting sub-mode in the multi-lens shooting mode, a user may use a function of switching a lens by a gesture in the multi-lens shooting mode, that is, the camera lens may be switched by the gesture. For example, the user may switch the camera lens from the single front-facing shooting mode to the single rear-facing shooting mode, from the single rear-facing shooting mode to the front-facing/rear-facing shooting mode, or the like by the gesture. This is not limited herein.

The single-lens shooting mode is a mode in which the electronic device performs shooting by using only one camera lens. In the single-lens shooting mode, the electronic device displays, in the shooting preview interface, only an image shot by the one camera lens. The single-lens shooting mode may include a front-facing shooting mode, a rear-facing shooting mode, and the like.

The front-facing shooting mode is a mode in which the electronic device performs shooting by using a front-facing camera lens. When the electronic device is in the front-facing shooting mode, an image collected by the front-facing camera lens may be displayed in real time on the shooting preview interface.

Optionally, the front-facing shooting mode may include a face recognition shooting sub-mode, a face-based unlocking shooting sub-mode, a portrait shooting sub-mode, a photo shooting (normal photo shooting) sub-mode, a video recording shooting sub-mode, a short video shooting sub-mode, a watermarking shooting sub-mode, a time lapse photography shooting sub-mode, a moving picture shooting sub-mode, and the like.

The rear-facing shooting mode is a mode in which the electronic device performs shooting by using a rear-facing camera lens. When the electronic device is in the rear-facing shooting mode, an image collected by the rear-facing camera lens may be displayed in real time on the shooting preview interface.

Optionally, the rear-facing shooting mode may include a photo shooting (normal photo shooting) sub-mode, a high pixel photo shooting sub-mode, a video recording (normal video recording) shooting sub-mode, a 60 fps video recording shooting sub-mode, a short video shooting sub-mode, a watermarking shooting sub-mode, a moving picture shooting sub-mode, a slow-motion shooting sub-mode, a portrait mode shooting sub-mode, a large aperture shooting sub-mode, a time lapse (time lapse) photography shooting sub-mode, a professional shooting sub-mode, a super macro shooting sub-mode, and the like.

Both the rear-facing shooting mode and the front-facing shooting mode may include a photo shooting sub-mode, a video recording shooting sub-mode, a short video shooting sub-mode, a watermarking shooting sub-mode, a moving picture shooting sub-mode, a time lapse photography shooting sub-mode, and the like. However, because started camera lenses are different, camera lens modes (sensormode) corresponding to a photo shooting sub-mode, a video recording shooting sub-mode, a short video shooting sub-mode, a watermarking shooting sub-mode, a moving picture shooting sub-mode, a time lapse photography shooting sub-mode, and the like in the rear-facing shooting mode are different from those corresponding to a photo shooting sub-mode, a video recording shooting sub-mode, a short video shooting sub-mode, a watermarking shooting sub-mode, a moving picture shooting sub-mode, a time lapse photography shooting sub-mode, and the like in the front-facing shooting mode. In other words, shooting scenarios corresponding to the photo shooting sub-mode, the video recording shooting sub-mode, the short video shooting sub-mode, the watermarking shooting sub-mode, the moving picture shooting sub-mode, the time lapse photography shooting sub-mode, and the like in the rear-facing shooting mode may be considered to be different from shooting scenarios corresponding to the photo shooting sub-mode, the video recording shooting sub-mode, the short video shooting sub-mode, the watermarking shooting sub-mode, the moving picture shooting sub-mode, the time lapse photography shooting sub-mode, and the like in the front-facing shooting mode.

It should be noted that the foregoing "multi-lens shooting mode", "front-facing/rear-facing shooting mode", "picture-in-picture shooting mode", "rear-facing/rear-facing shooting mode", "single-lens shooting mode", "front-facing shooting mode", and "rear-facing shooting mode" are only some names used in embodiments of this application. Meanings of the names have been recorded in embodiments of this application, and the names thereof do not constitute any limitation to embodiments.

The scenario in which another application invokes a camera application to perform shooting may include a face recognition scenario, a face-based unlocking scenario, a face recognition payment scenario, and a scenario in which a photo shooting/video recording function is enabled.

The face-based unlocking scenario may be a scenario in which a lock screen application enables a shooting function of the camera application, and performs face-based unlocking based on a shot image.

The face recognition scenario may be a scenario in which applications such as a bank application and a financial application (for example, Alipay®) enable a shooting function of the camera application when performing identity verification, and perform face recognition based on a shot image.

A face recognition payment scenario may be a scenario in which applications such as a bank application and a financial application (for example, Alipay®) enable a shooting function of the camera application when performing face recognition payment, and perform face recognition and face recognition payment based on a shot image.

The scenario in which a photo shooting/video recording function is enabled may be a scenario in which another application (for example, WeChat®, QQ®, or the like) enables a shooting function of the camera application to perform shooting or video recording.

AE algorithm: is an algorithm that outputs an exposure parameter (which includes exposure time and an exposure gain) of a camera based on a brightness statistical value (which is affected by intensity of external light) of an image captured by a camera lens. To be specific, an input of the AE algorithm is the brightness statistical value of the image captured by the camera lens, and an output of the AE algorithm is the exposure parameter of the camera (which includes the exposure time and the exposure gain).

In a possible design, according to the AE algorithm, an exposure may be output first, and an exposure meter configured by a PQ is queried based on the exposure, to obtain the exposure parameter (the exposure time and the exposure gain) of the camera. Table 1 is an example of an exposure meter configured by a PQ.

TABLE 1

|  | Minimum exposure time (ns) | Maximum exposure time (ns) | Minimum gain | Maximum gain |
|---|---|---|---|---|
| 1 | 10,000,000 | 10,000,000 | 1,000 | 1,000 |
| 2 | 10,000,000 | 20,000,000 | 1,000 | 12,000 |
| 3 | 20,000,000 | 20,000,000 | 12,000 | 32,000 |
| 4 | 20,000,000 | 60,000,000 | 32,000 | 128,000 |

As shown in Table 1, the exposure meter configured by the PQ includes a plurality of groups of data (there are four groups of data, but are not limited herein. The exposure meter configured by the PQ may include more data). Each group of data may include a minimum exposure time, a maximum exposure time, a minimum gain, and a maximum gain. For example, in group 1 of data, a minimum exposure time is 10,000,000 ns (that is, 10 ms), a maximum exposure time is 10,000,000 ns (the maximum exposure time may be the same as the minimum exposure time), a minimum gain is 1,000, and a maximum gain is 1,000 (the maximum gain may be the same as the minimum gain).

In each group of data in the exposure meter configured by the PQ, a product of a minimum exposure time and a minimum gain means a minimum exposure corresponding to the group of data, and a product of a maximum exposure time and a maximum gain means a maximum exposure corresponding to the group of data. An interval between the minimum exposure and the maximum exposure corresponding to the group of data is an exposure interval corresponding to the group of data.

It is determined, by inquiring a meter (for example, table 1) based on the exposure output according to the AE algorithm, an exposure interval corresponding to a group of data in which the exposure output according to the AE algorithm falls, and the exposure time and an exposure gain of the camera lens are determined based on the group of data. The determined exposure time and exposure gain may be configured to a camera lens driver, to enable the camera lens driver to configure the exposure time and the exposure gain to the camera lens.

However, a current exposure meter configured by the PQ is manually configured. This may cause the following problems:

(1) Because the configured exposure time is long, a frame rate of the camera is low. This does not meet an expectation. It should be understood that, during shooting of the camera, a cycle for processing each frame of image is greater than or equal to the exposure time, where the cycle for processing each frame of image=1/frame rate, that is, 1/frame rate is greater than or equal to the exposure time. Therefore, if the exposure time is longer, the frame rate is lower. To ensure the frame rate, it is necessary to ensure that the configured exposure time is appropriate, that is, the exposure time is not greater than 1/frame rate. However, this is not considered by the current exposure meter configured by the PQ. There is inappropriate exposure time in the table (an exposure time greater than 1/frame rate), which affects the frame rate. As a result, the frame rate of the camera for video recording is low. This affects user experience.

(2) If there is a flicker (flicker) light source, the exposure time (the maximum exposure time and/or minimum exposure time) in the exposure meter configured by the PQ is not an integer multiple of a flicker frequency of the light source. This causes screen flickering of the electronic device during shooting. The flicker light source may include a light source supporting an alternating current power supply, for example, an indoor ceiling lamp, a screen of a television, and the like.

(3) When the camera lens is in different camera lens modes (sensormode), brightness is not matched. A different sensormode is corresponding to different photosensitivity (binsumratio). When the camera lens is switched to the sensormode, photosensitivity of the camera lens is also changed. For example, the photosensitivity of the camera lens may be decreased by half. To offset a change in photosensitivity, in a conventional technology, the minimum gain and the maximum gain in the exposure meter are simultaneously doubled as shown in Table 2.

TABLE 2

|  | Minimum exposure time (ns) | Maximum exposure time (ns) | Minimum gain | Maximum gain |
|---|---|---|---|---|
| 1 | 10,000,000 | 10,000,000 | 2,000 | 2,000 |
| 2 | 10,000,000 | 20,000,000 | 2,000 | 24,000 |
| 3 | 20,000,000 | 20,000,000 | 24,000 | 64,000 |
| 4 | 20,000,000 | 60,000,000 | 64,000 | 256,000 |

As shown in Table 2, relative to Table 1, a minimum gain and a maximum gain in each group of data in Table 2 are doubled. However, when the adjusted exposure meter is used in a high-brightness scenario, overexposure of the camera may occur, and cannot be repaired by debugging. When the adjusted exposure meter is used in a low-brightness scenario, although consistency of brightness is ensured, noise is increased. In addition, a debugging interval of the exposure meter is seriously limited, and the minimum gain in the exposure meter is 2,000. As a result, noise of the image is wholly increased.

(4) The PQ needs to separately set the exposure meter based on different photosensitivity of the camera lens in the different sensormode, resulting in a large workload.

To resolve the foregoing problems, embodiments of this application provide a method and an apparatus for determining an exposure parameter, to intelligently configure an exposure meter, obtain a more accurate exposure parameter based on the intelligently configured exposure meter, and improve imaging quality.

The method for determining an exposure parameter provided in embodiments of this application may be applied to an electronic device. For example, the electronic device may be a mobile phone (including a foldable screen phone and a bar-type mobile phone), a tablet computer, a desktop (a desktop computer), a handheld computer, a notebook computer (a laptop computer), an ultra-mobile personal computer (ultra-mobile personal computer, UMPC), a netbook, a personal digital assistant (personal digital assistant, PDA), an augmented reality (augmented reality, AR) \ virtual reality (virtual reality, VR) device, or the like. A specific form of the electronic device is not particularly limited in embodiments of this application.

FIG. 1 is a schematic diagram of a structure of an electronic device 100 according to an embodiment of this application. As shown in FIG. 1, the electronic device 100 may include a processor 110, an external memory interface 120, an internal memory 121, a universal serial bus (universal serial bus, USB) interface 130, a charging management module 140, a power supply management module 141, a battery 142, an antenna 1, an antenna 2, a mobile communication module 150, a wireless communication module 160, and an audio module 170, a loudspeaker 170A, a receiver 170B, a microphone 170C, a headset jack 170D, a sensor module 180, a button 190, a motor 191, an indicator 192, a camera lens 193, a display screen 194, a subscriber identification module (subscriber identification module, SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It should be understood that the schematic structure in this embodiment does not constitute a specific limitation on the electronic device 100. In some other embodiments, the electronic device 100 may include more or fewer components than those shown in the figure, some components that are combined, some components that are split, or different component arrangements that are used. The components in the portrait may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video encoder and decoder, a digital signal processor (digital signal processor, DSP), a baseband processor, and/or a neural-network processing unit (neural-network processing unit, NPU). Different processing units may be separate devices, or may be integrated into one or more processors.

The charging management module 140 is configured to receive charging input from the charger. The charging management module 140 may supply power to the electronic device by the power supply management module 141 while charging the battery 142.

The power supply management module 141 is configured to connect to the battery 142, the charging management module 140, and the processor 110. The power supply management module 141 receives an input from the battery 142 and/or the charging management module 140, and supplies power to the processor 110, the internal memory 121, the external memory, the display screen 194, the camera lens 193, the wireless communication module 160, and the like. In some other embodiments, the power supply management module 141 may alternatively be arranged in the processor 110. In some other embodiments, the power supply management module 141 and the charging management module 140 may be disposed on a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be multiplexed to improve utilization of the antennas. For example, the antenna 1 may be multiplexed as a diversity antenna of a wireless local area network.

The mobile communication module 150 may provide a solution applied to the electronic device 100 for wireless communication including 2G/3G/4G/5G and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1.

The modem processor may include a modulator and a demodulator. The modulator is configured to modulate a to-be-sent low-frequency baseband signal into a medium frequency signal or a high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the loudspeaker 170A, the receiver 170B, and the like), or displays an image or a video through the display screen 194.

The wireless communication module 160 may provide wireless communication solutions applicable to the electronic device 100, including WLAN (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC), an infrared (infrared, IR) technology, and the like. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 are coupled, and the antenna 2 and the wireless communication module 160 in the electronic device 100 are coupled, so that the electronic device 100 can communicate with a network and another device by using a wireless communication technology. The wireless communication technology may include a global system for mobile communication (global system for mobile communication, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), the BT, the GNSS, the WLAN, the NFC, the FM, the IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display screen 194, the application processor, and the like. The GPU is a microprocessor for image processing and is connected to the display screen 194 and the application processor. The GPU is configured to perform mathematical and geometric calculations and graphics rendering. The processor 110 may include one or more GPUs, and the GPU executes program instructions to generate or change display information.

The display screen 194 is configured to display an image, a video, and the like. The display screen 194 includes a display panel. The display panel may be a liquid crystal display (liquid crystal display, LCD) screen, a light emitting diode (light emitting diode, LED) an organic light-emitting diode (organic light-emitting diode, OLED), an active-matrix organic light emitting diode (active-matrix organic light emitting diode, AMOLED), a flexible light-emitting diode (flex light-emitting diode, FLED), a Mini-Led, a Micro-Led, a Micro-oLed, quantum dot light emitting diodes (quantum dot light emitting diodes, QLED), and the like.

The electronic device 100 may implement a shooting function through the ISP, the camera lens 193, the video encoder and decoder, the GPU, the display screen 194, the application processor, and the like. The ISP is configured to handle data returned by the camera lens 193. The camera lens 193 is configured to capture a still image or a video. The digital signal processor is configured to process a digital signal. In addition to a digital image signal, the digital signal processor may further process another digital signal. The video encoder and decoder are configured to compress or decompress a digital video. The electronic device 100 may support one or more types of video encoders and decoders. In this way, the electronic device 100 may play or record videos in a plurality of encoding formats, for example, moving picture experts group (moving picture experts group, MPEG) 1, MPEG2, MPEG3, and MPEG4.

There may be 1 to N camera lenses 193. Each camera lens includes a photosensitive element (CCD/CMOS). The photosensitive element (CCD/CMOS) may perform photosensitive, collect a photon, and convert the photon into a charge.

For example, the electronic device may include two front-facing camera lenses and three rear-facing camera lenses. The front-facing camera lens may include a main front-facing camera lens and a TOF camera lens. The TOF camera lens may include a TX and an RX. TX may be used to emit a light signal (infrared light or a laser pulse) and, RX may be used to receive imaging. The TX may be, for example, an infrared light emitter. The RX may be, for example, a complementary metal oxide semiconductor (complementary metal oxide semiconductor, CMOS) or a charge coupled device (charge coupled device, CCD) image sensor. Optionally, the front-facing camera lens may further include a front-facing secondary camera lens.

The rear-facing camera lens, for example, may include a rear-facing main camera lens, a wide-angle camera lens (referred to as an ultra-wide-angle camera lens), and a far-focus camera lens. Certainly, the rear-facing camera lens may further include another type of camera lens, for example, may include a depth camera lens module, a black-and-white camera lens module, a macro camera lens module, and the like. This is not limited in this application. The rear-facing main camera lens may be a wide-angle camera lens. A viewing angle of the rear-facing main camera lens may be different from a viewing angle of the ultra-wide-angle camera lens.

The external memory interface 120 may be configured to be connected to an external memory card such as a Micro SD card, to expand a storage capability of the electronic device 100. The external memory card communicates with the processor 110 through the external memory interface 120, to implement a data storage function. For example, files such as music and videos are stored in an external storage card. The internal memory 121 may be configured to store computer-executable program code. The executable program code includes instructions. The processor 110 runs the instructions stored in the internal memory 121, to perform various function applications and data processing of the electronic device 100. For example, in an embodiment of this application, the processor 110 may execute an instruction stored in the internal memory 121, and the internal memory 121 may include a program storage region and a data storage region. The program storage area may store an operating system, an application required by at least one function (such as a voice playback function and an image playback function), and the like. The data storage area may store data (for example, audio data and an address book) and the like created during use of the electronic device 100. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement audio functions such as music playing and sound recording, through the audio module 170, loudspeaker 170A, receiver 170B, microphone 170C, headset jack 170D, and application processor. Examples include music playback, recording, and the like.

The audio module 170 is configured to convert digital audio information into an analog audio signal and output the analog audio signal, and is further configured to convert analog audio input into a digital audio signal. The audio module 170 may be further configured to code and decode an audio signal. The loudspeaker 170A, also referred to as a "horn", is configured to convert an audio electrical audio signal into a sound signal. The receiver 170B, also referred to as an "earpiece", is configured to convert an audio electrical signal into a sound signal. The microphone 170C, also referred to as a "voice tube" or a "mike", is configured to convert a sound signal into an electrical signal. The headset jack 170D is configured to be connected to a wired headset.

The button 190 includes a power button, a volume button, and the like. The button 190 may be a mechanical button or a touch button. The electronic device 100 may receive a key input, and generate a key signal input related to a user setting and function control of the electronic device 100. The motor 191 may generate a vibration prompt. The motor 191 may be used for an incoming call vibration alert or a touch vibration feedback. The indicator 192 may be an indicator light, may be configured to indicate a charging status or a power change, and may be further configured to indicate a message, a missed incoming call, a notification, and the like. The SIM card interface 195 is used for connecting a SIM card. The SIM card may be inserted into the SIM card interface 195 or removed from the SIM card interface 195 to implement contact with and separation from the electronic device 100. The electronic device 100 may support 1 or N SIM card interfaces, N being a positive integer greater than 1. The SIM card interface 195 can support a nano SIM card, a micro SIM card, a SIM card, and the like.

The method in the following embodiment may be implemented by the electronic device 100 having the foregoing hardware structure.

A software system of the electronic device 100 may assume a layered architecture, an event-driven architecture, a microkernel architecture, a microservice architecture, or a cloud architecture. In embodiments of the present invention, an Android® system of a layered architecture is used as an example to describe a software structure of the electronic device 100.

A layered architecture divides software into several layers, with each layer having a clear role and responsibilities. Layers communicate with each other through software interfaces. In some embodiments, the Android® system may include: an application layer, an application framework layer, an Android runtime (Android runtime) and a system library, a hardware abstraction layer (hardware abstraction layer, HAL), and a kernel layer. It should be noted that, the Android® system is used as an example for description in this embodiment of this application. In another operating system (for example, an iOS system), the solutions of this application can still be implemented as long as the functions implemented by the functional modules are similar to those implemented in this embodiment of this application.

The application program layer may include a series of application program packages.

Figure 2:
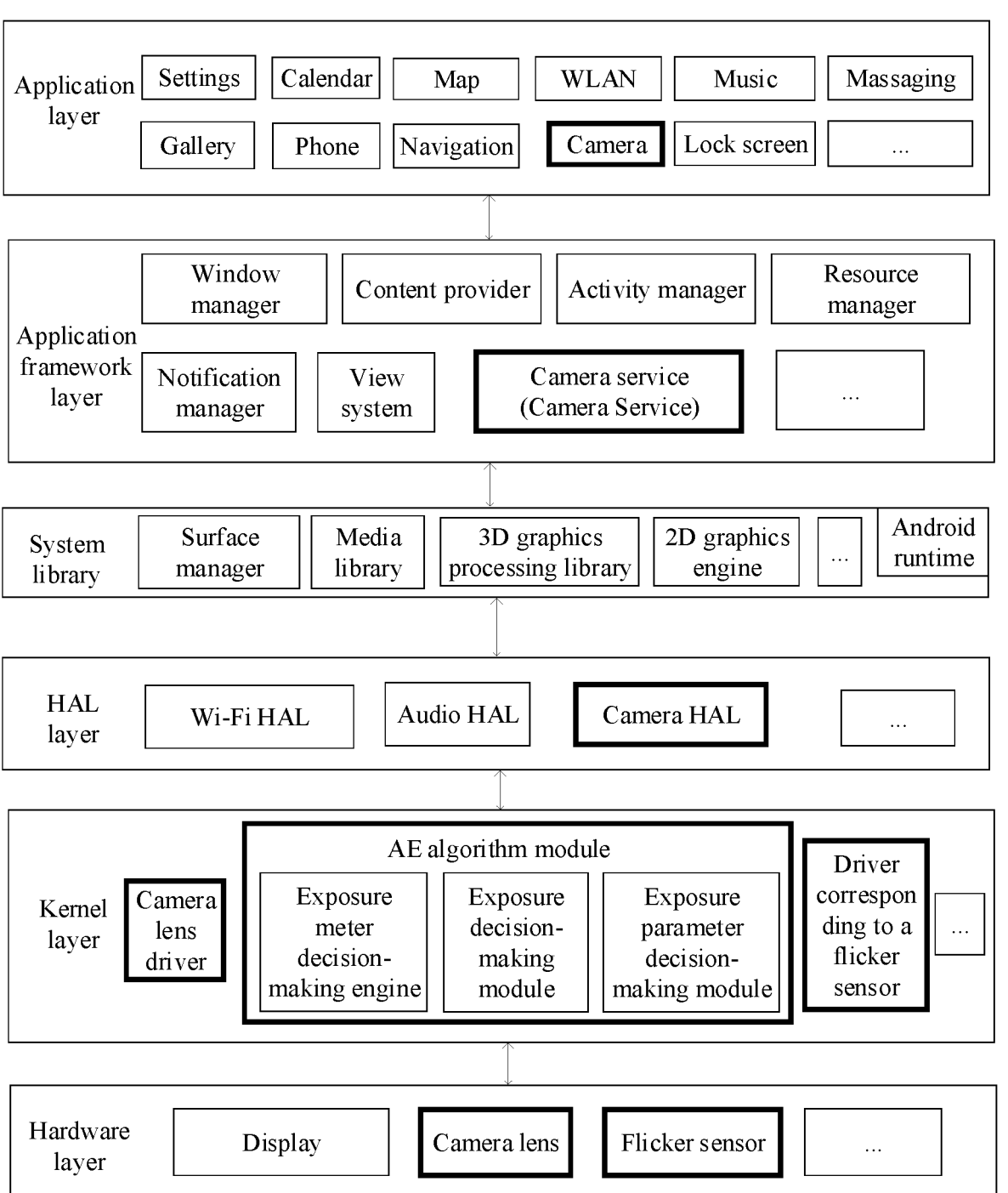
FIG. 2 is a schematic diagram of an architecture of software of an electronic device according to an embodiment of this application.

As shown in FIG. 2, an application package may include applications such as a camera, a gallery, a calendar, a phone, a map, navigation, a wireless local area network (wireless local area network, WLAN), Bluetooth, music, a video, messaging, a lock screen application, a settings application, and the like. Certainly, the application layer may further include other applications such as a payment application, a shopping application, a bank application, a chat application, or a financial application. This is not limited in this application.

A camera application has functions such as shooting and video recording. In response to an operation that a user opens the camera application, the electronic device may perform shooting or video recording. It should be understood that the functions of the camera application such as shooting and video recording may also be enabled by another application. For example, the lock screen application may enable the shooting function of the camera application to perform face recognition or face-based unlocking based on a shot image.

The application framework layer provides an application programming interface (application programming interface, API) and a programming framework for applications in the application layer. The application framework layer includes some predefined functions. For example, the application framework layer may include an activity manager, a window manager, a content provider, a view system, a resource manager, a notification manager, a camera service (Camera Service), and the like. This is not limited in this embodiment of this application.

The Camera Service may be started in a power-on phase of the electronic device, and may be used to deliver and store information about the camera lens.

The system library may include a plurality of functional modules, for example, a surface manager (surface manager), a media library (Media Library), a 3D graphics processing library (for example, an OpenGL ES), a 2D graphics engine (for example, an SGL), and the like.

The surface manager is configured to manage a display subsystem, and provide fusion of 2D and 3D layers for a plurality of applications.

The media library supports playback and recording of a plurality of common audio and video formats, a static image file, and the like. The media library may support a plurality of audio and video encoding formats such as MPEG4, H.264, MP3, AAC, AMR, JPG, and PNG.

The OpenGL ES is configured to implement three-dimensional graphics drawing, image rendering, composition, layer processing, and the like.

The SGL is a drawing engine for 2D drawings.

The Android runtime (Android Runtime) includes a core library and a virtual machine. The Android Runtime is responsible for scheduling and management of the Android system. The kernel library includes two parts: One part is a functional function that needs to be invoked by a java language, and the other part is a kernel library of Android. The application layer and the application framework layer run on the virtual machine. The virtual machine executes Java files at the application layer and the application framework layer as binary files. The virtual machine is configured to enable a function such as object life cycle management, stack management, thread management, security and exception management, and garbage collection.

The HAL layer is obtained by encapsulating a Linux kernel driver, provides an interface for an upper layer, and shields an implementation detail of hardware of a lower layer.

The HAL layer may include a Wi-Fi HAL, an audio (audio) HAL, and a camera HAL.

The camera HAL is a core software framework of the camera lens (Camera).

The kernel layer is a layer between hardware and software. The kernel layer includes at least a display driver, a camera lens driver, an audio driver, and a sensor driver. The camera lens driver is a driver layer of a Camera device and is mainly responsible for interaction with hardware.

In this embodiment of this application, the camera lens driver may include a driver corresponding to the rear-facing main camera lens, a driver corresponding to the wide-angle camera lens, a driver corresponding to the far-focus camera lens, a driver corresponding to the front-facing camera lens, and the like. The driver corresponding to the front-facing camera lens may include a driver corresponding to the front-facing main camera lens and a driver corresponding to the TOF camera lens.

In this embodiment of this application, the kernel layer may further include an AE Algorithm module. The AE algorithm module may include an exposure meter decision-making engine, an exposure decision-making module, and an exposure parameter decision-making module. The exposure meter decision-making engine is configured to correct an initial exposure meter based on a minimum frame rate in a current shooting scenario, photosensitivity of a camera lens, and a flicker frequency of a flicker light source. An input of the exposure meter decision-making module is a brightness statistical value of an image shot by a camera lens, and an output of the exposure meter decision-marking module is an exposure of the camera lens. The exposure parameter decision-making module may obtain the exposure of the camera lens from the exposure decision-making module, obtain the corrected exposure meter from the exposure meter decision-making engine, and query the corrected exposure meter based on the exposure, to determine an exposure parameter (an exposure time and an exposure gain).

The hardware layer includes a display, a camera lens, and the like. The camera lens may include a rear-facing main camera lens, a wide-angle camera lens, a far-focus camera lens, and a front-facing camera lens. The front-facing camera lens may include a front-facing main camera lens, a TOF camera lens, and the like.

Technical solutions in embodiments of this application are described below with reference to the accompanying drawings in embodiments of this application. In the description of this application, unless otherwise specified, "at least one" indicates one or more, and "a plurality of" indicates two or more. Moreover, to clearly describe the technical solutions in embodiments of this application, in embodiments of this application, terms such as "first" and "second" are used to define same items or similar items whose functions and effects are substantially the same. A person skilled in the art may understand that the words such as "first" and "second" do not limit a quantity and an execution order, and the words such as "first" and "second" unnecessarily define a difference.

For ease of understanding, the method provided in embodiments of this application is specifically described with reference to the accompanying drawings.

Interaction between software modules and modules used in a method for determining an exposure parameter provided in this embodiment of this application are described below by using an example in which an electronic device is a mobile phone.

Figure 3:
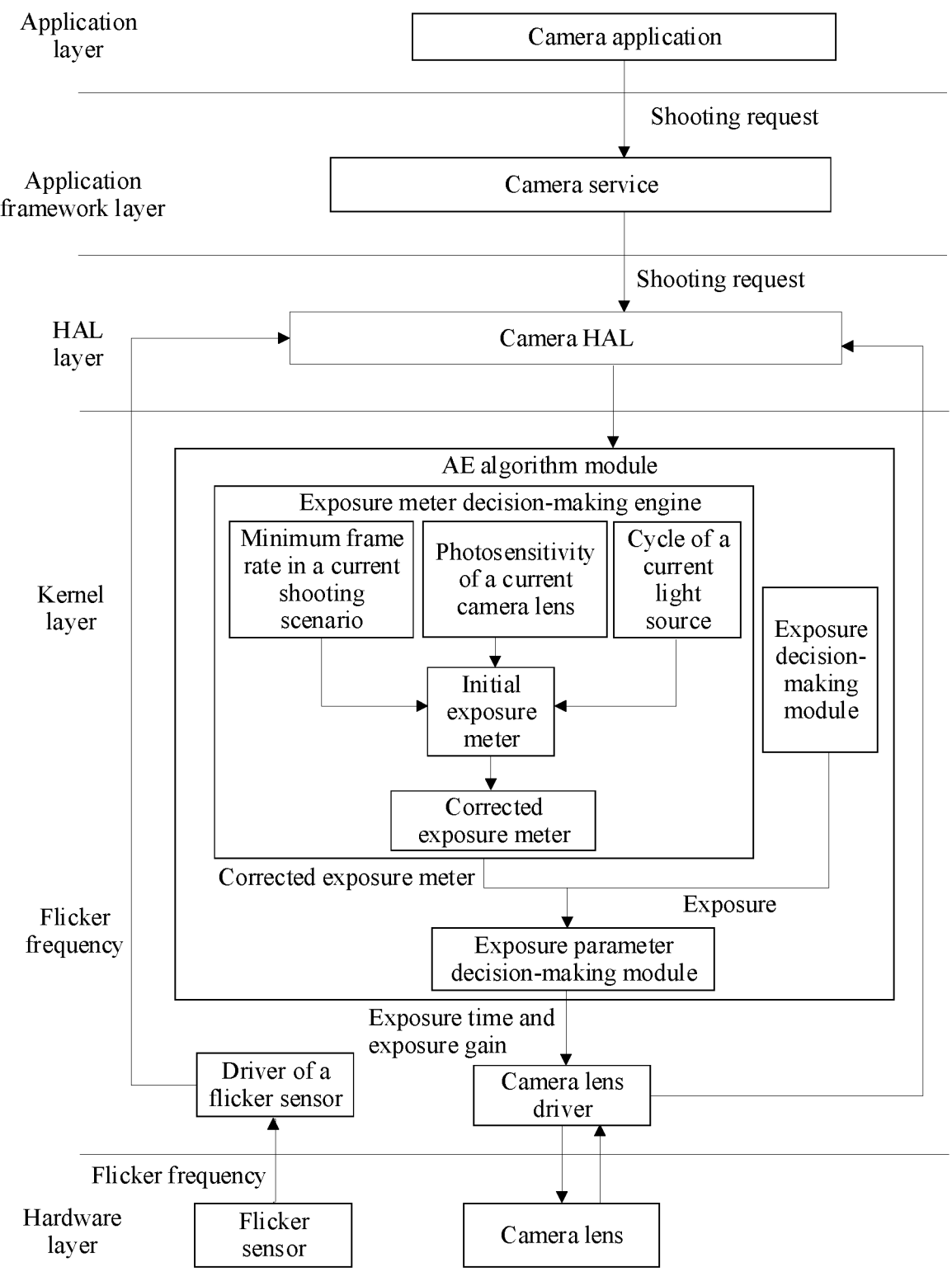
FIG. 3 is a schematic diagram of another architecture of software of an electronic device according to an embodiment of this application.

As shown in FIG. 3, in response that a user opens a camera application or another application invokes a camera application, a camera application in an application layer may send a shooting request to a camera service in an application framework layer. The shooting request may include parameters such as a camera lens identity (identity, ID), a frame rate range (including a maximum frame rate and a minimum frame rate), and a shooting mode that are corresponding to the current shooting scenario. The camera service may directly send the shooting request to a camera HAL of a HAL layer. After receiving the shooting request, the camera HAL may send the camera lens ID and frame rate range that are corresponding to the current shooting scenario to a camera lens driver. The camera lens driver may determine photosensitivity of a current camera lens (a camera lens indicated by the camera lens ID) based on the camera lens ID and the frame rate range that are corresponding to the current shooting scenario, and may send the photosensitivity to the camera HAL. The camera lens driver may open a corresponding camera lens based on the camera lens ID corresponding to the current shooting scenario. The opened camera lens may acquire image data and report the image data to the camera HAL by using the camera lens driver, to enable the camera HAL to obtain a brightness statistical value in the image data. The camera HAL may further obtain, from a driver corresponding to the flicker sensor, a frequency that a flicker sensor acquires a flicker light source. After the camera lens is opened, the flicker sensor may be started. The flicker sensor may continuously obtain the frequency of the flicker light source, and report the frequency of the flicker light source to the driver corresponding to the flicker sensor. The driver corresponding to the flicker sensor may continuously report the frequency of the flicker light source to the camera HAL. In this way, the camera HAL may obtain the frequency of the flicker light source, the minimum frame rate in the current shooting scenario, and the photosensitivity of the camera lens (the camera lens corresponding to the current shooting scenario). The camera HAL may send parameters such as the brightness statistical value in the image data, the frequency of the flicker light source, the minimum frame rate in the current shooting scenario, and the photosensitivity of the camera lens (a camera lens corresponding to the current shooting scenario) to an AE algorithm module of the kernel layer. The exposure meter decision-making engine in the AE algorithm module may correct the initial exposure meter based on the frequency of the flicker light source, the minimum frame rate in the current shooting scenario, and the photosensitivity of the camera lens (the camera lens corresponding to the current shooting scenario), to obtain a finally corrected exposure meter. In a possible design, the exposure meter decision-making engine may first correct the initial exposure meter (a first exposure meter) based on the frequency of the flicker light source, to obtain an exposure meter A (a third exposure meter), correct the exposure meter A based on the minimum frame rate in the current shooting scenario, to obtain an exposure meter B (a fourth exposure meter), and correct an exposure meter B based on the photosensitivity of the camera lens, to obtain an exposure meter C (a second exposure meter). The exposure meter C is the finally corrected exposure meter. The exposure decision-making module in the AE algorithm module may determine an exposure of the camera lens based on the brightness statistical value of the image shot by the camera lens. The exposure parameter decision-making module may obtain the exposure of the camera lens from the exposure decision-making module, obtain the corrected exposure meter from the exposure meter decision-making engine, and query the corrected exposure meter based on the exposure, to determine an exposure parameter (an exposure time and an exposure gain). The exposure parameter decision-making module may send the exposure time and the exposure gain to the camera lens driver, to enable the camera lens driver to configure the exposure time and the exposure gain for the camera lens.

Figure 4A:
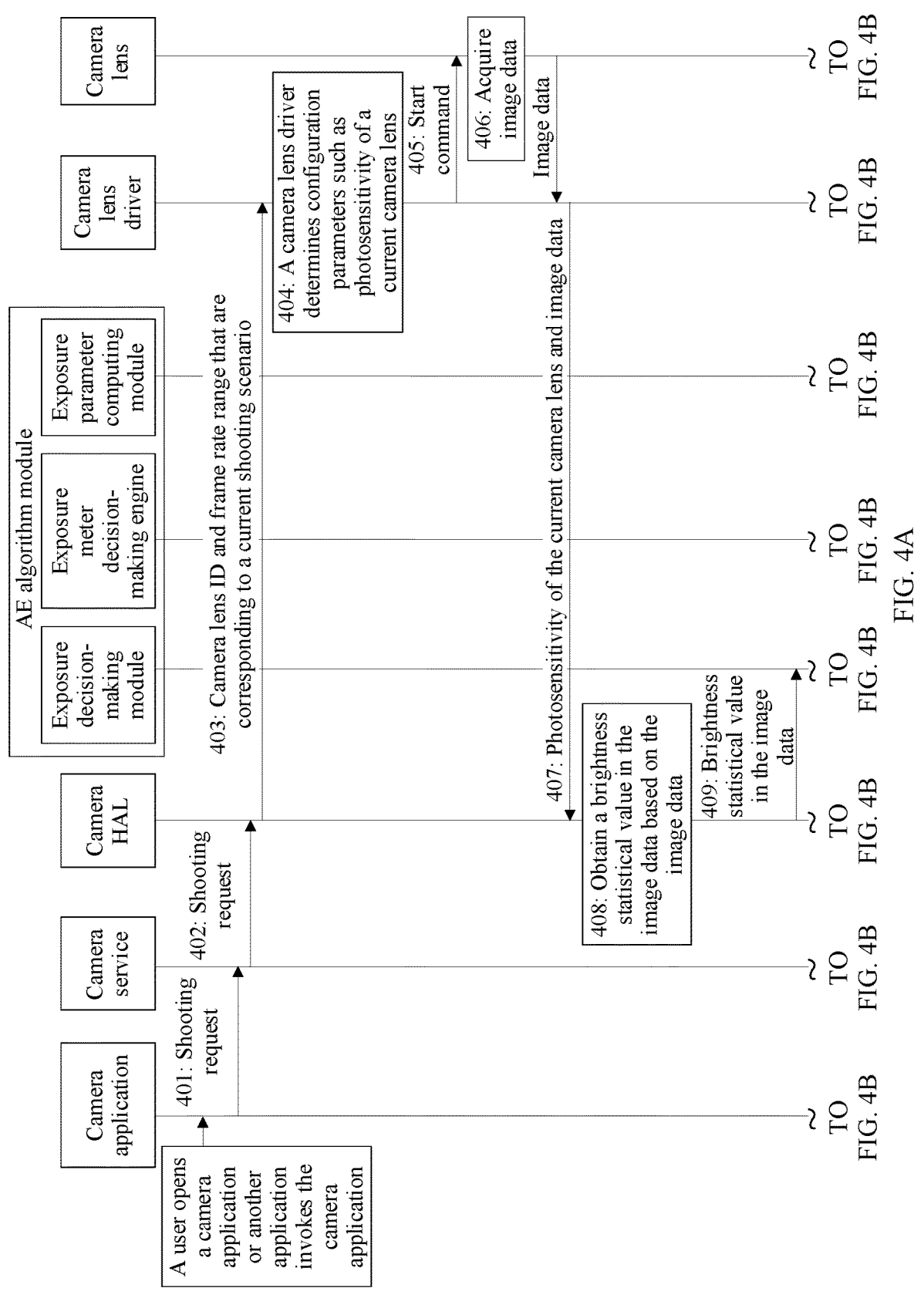
FIG. 4A and FIG. 4B are a schematic diagram of module interaction according to an embodiment of this application.
Figure 4B:
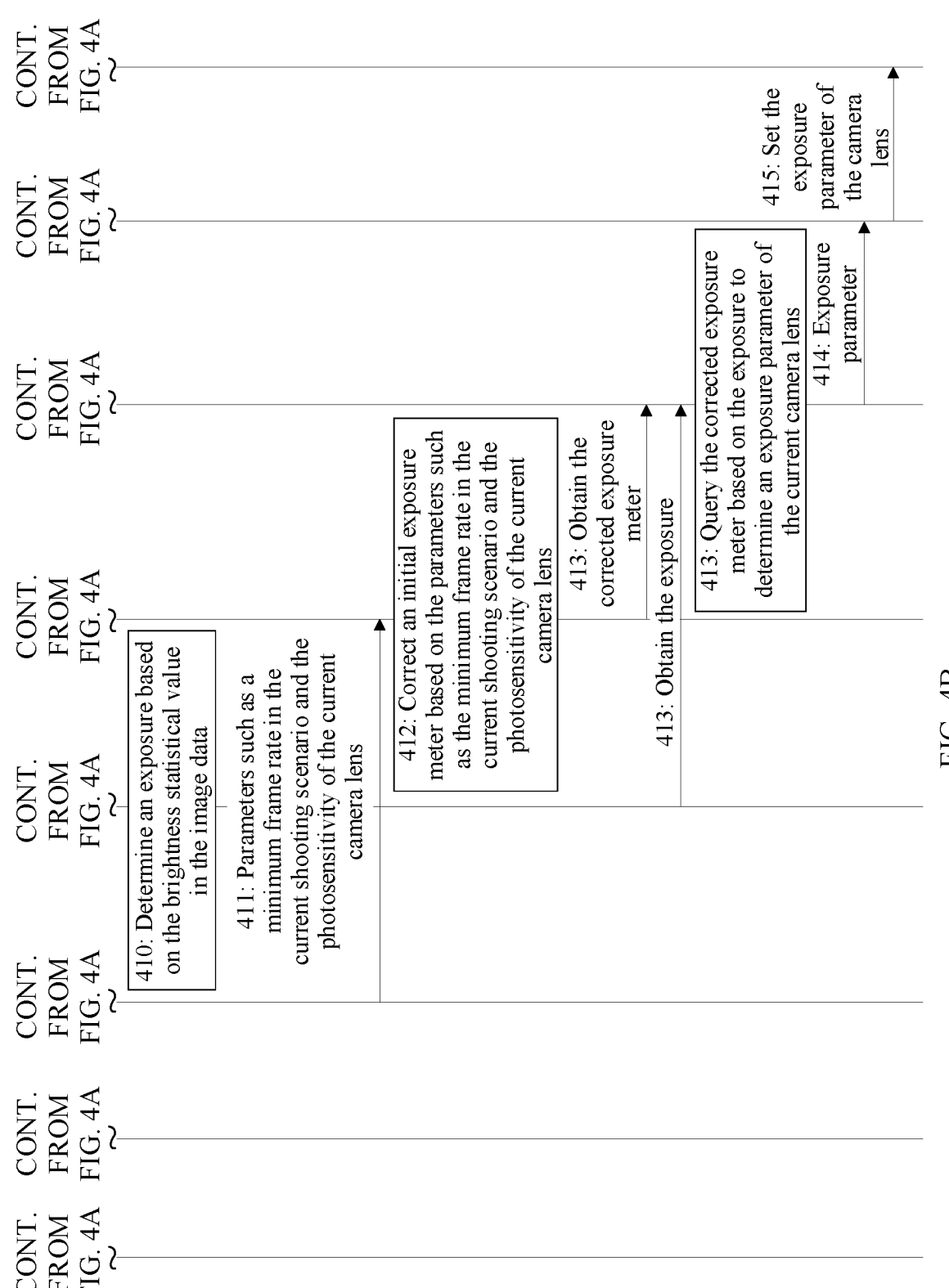

As shown in FIG. 4A and FIG. 4B, an embodiment of this application provides a method for determining an exposure parameter. The method includes the following steps.

401: In response that a user opens a camera application or another application invokes a camera application, a camera application in an application layer sends a shooting request to a camera service in an application framework layer.

In response that the user opens the camera application or the another application invokes the camera application, the camera application identifies a current shooting scenario, determines a camera lens (for example, a first camera lens) corresponding to the current shooting scenario, a frame rate range of the camera lens (including a maximum frame rate and a minimum frame rate), a shooting mode, and the like.

The shooting request may include parameters such as a camera lens ID, a frame rate range (including a maximum frame rate and a minimum frame rate), and a shooting mode that are corresponding to a current shooting scenario. The current shooting scenario may include a scenario in which an electronic device performs shooting (photo shooting or video recording) in a different shooting mode after a camera application is opened and a shooting scenario in which another application invokes a camera application to perform shooting. For related descriptions, refer to the foregoing description. Details are not described herein.

402: The camera service sends the shooting request to a camera HAL in a HAL layer.

403: After receiving the shooting request, the camera HAL sends a camera lens ID and a frame rate range that are corresponding to the current shooting scenario to a camera lens driver.

404: The camera lens driver determines configuration parameters such as photosensitivity of a current camera lens (a camera lens indicated by the camera lens ID).

405: The camera lens driver sends a start command to a corresponding camera lens (the camera lens indicated by the camera lens ID), to open the corresponding camera lens.

406: The opened camera lens acquires image data, and may report the acquired image data to the camera lens driver.

407: The camera lens driver may report the photosensitivity of the current camera lens and the image data to the camera HAL.

The camera lens may separately report the photosensitivity of the current camera lens and the image data to the camera HAL, or may simultaneously report the photosensitivity of the current camera lens and the image data to the camera HAL. This is not limited in this application.

408: The camera HAL obtains a brightness statistical value in the image data based on the image data.

The camera HAL may process the image data by using another module (for example, an image data processing module), to obtain the brightness statistical value in the image data.

It should be noted that the camera HAL may further obtain, from a driver corresponding to the flicker sensor, a frequency that a flicker sensor acquires a flicker light source. After the camera lens is opened, the flicker sensor may be started. The flicker sensor may continuously obtain the frequency of the flicker light source and report the frequency of the flicker light source to the driver corresponding to the flicker sensor. The driver corresponding to the flicker sensor may continuously report the frequency of the flicker light source to the camera HAL.

409: The camera HAL sends the brightness statistical value in the image data to an exposure decision-making module in an AE algorithm module.

410: The exposure decision-making module determines an exposure of the camera lens based on the brightness statistical value in the image data.

411: The camera HAL sends parameters such as the frequency of the flicker light source, a minimum frame rate in the current shooting scenario, and the photosensitivity of the current camera lens (the camera lens corresponding to the current shooting scenario) to an exposure meter decision-making engine in the AE algorithm module.

412: The exposure meter decision-making engine corrects an initial exposure meter based on the minimum frame rate in the current shooting scenario, the photosensitivity of the current camera lens, and the flicker frequency of the flicker light source.

Figure 5:
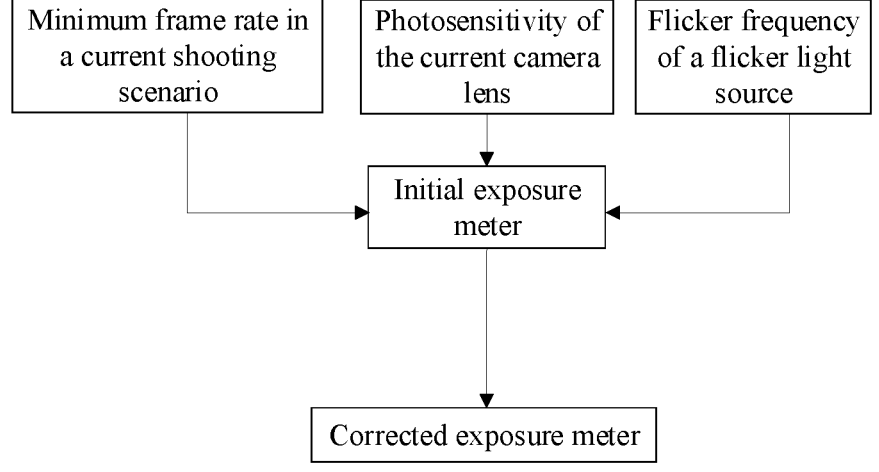
FIG. 5 is a schematic diagram of adjustment of an exposure meter according to an embodiment of this application.

As shown in FIG. 5, the exposure meter decision-making engine may modify the initial exposure meter based on the parameters such as the minimum frame rate in the current shooting scenario, the photosensitivity of the current camera lens, and the flicker frequency of the flicker light source, to obtain a corrected (updated) exposure meter.

In a possible design, the exposure meter decision-making engine may first correct the initial exposure meter based on the frequency of the flicker light source in the current shooting scenario, to obtain an exposure meter A, correct the exposure meter A based on the minimum frame rate in the current shooting scenario, to obtain an exposure meter B, and correct the exposure meter B based on photosensitivity of the camera lens, to obtain an exposure meter C. The exposure meter C is the finally corrected exposure meter. Alternatively, the exposure meter decision-making engine may first correct the initial exposure meter based on the minimum frame rate in the current shooting scenario, to obtain an exposure meter D, correct the exposure meter D based on the frequency of the flicker light source in the current shooting scenario, to obtain an exposure meter E, and correct the exposure meter E based on the photosensitivity of the camera lens, to obtain an exposure meter F. The exposure meter F is the finally corrected exposure meter. It should be noted that there may be a plurality of manners for the exposure meter engine to correct the initial exposure meter based on the parameters such as the minimum frame rate in the current shooting scenario, the photosensitivity of the sensor, and the flicker frequency of the flicker light source, and examples are not listed herein.

The following describes a process in which the exposure meter decision-making engine corrects a current initial exposure meter based on a cycle of the light source to obtain the exposure meter A.

After the exposure meter decision-making engine obtains the frequency of the flicker light source in the current shooting scenario, the exposure meter decision-making engine may modify an exposure time (including a minimum exposure time and a maximum exposure time) in the current initial exposure meter to an integer multiple of the frequency of the flicker light source. The frequency of the flicker light source may be measured by using an anti-flicker sensor (flicker sensor) of the electronic device, or may be calculated by the electronic device according to an image algorithm. This is not limited in this application.

For example, assuming that the current initial exposure meter is shown in Table 1, if the frequency of the flicker light source is 60 Hz, the exposure meter A obtained after the current initial exposure meter is updated based on the frequency of the flicker light source may be shown in Table 3.

TABLE 3

| | Minimum exposure time (ns) | Maximum exposure time (ns) | Minimum gain | Maximum gain |
|---|---|---|---|---|
| 1 | 8,355,660 | 8,355,660 | 1,000 | 1,000 |
| 2 | 8,355,660 | 16,652,060 | 1,000 | 12,000 |
| 3 | 16,652,060 | 16,652,060 | 12,000 | 32,000 |
| 4 | 16,652,060 | 50,133,960 | 32,000 | 128,000 |

A minimum exposure time and a maximum exposure time in each group of data in Table 3 have been updated to an integer multiple of the frequency of the flicker light source (for example, 60 Hz). Therefore, screen flickering can be avoided.

The following describes a process in which the exposure meter decision-making engine corrects the exposure meter A to obtain the exposure meter B based on the minimum frame rate in the current shooting scenario. The minimum frame rate in the current shooting scenario means a minimum frame rate of the camera lens when the current shooting scenario is a preview (including preview in various shooting modes) scenario, a video recording scenario, a video clip scenario, a moving picture scenario, and the like.

After the exposure meter decision-making engine obtains the minimum frame rate (min_fps) in the current shooting scenario, the exposure meter decision-making engine may modify a maximum exposure time in a plurality of groups of data in the current initial exposure meter to 1/min_fps. The minimum frame rate in the current shooting scenario is related to a current shooting mode of the electronic device. For example, if the current shooting mode is a night mode, the minimum frame rate in the current shooting scenario is lower, for example, 12 fps. If the current shooting mode is a normal shooting mode, the minimum frame rate in the current shooting scenario is higher, for example, 15 fps.

For example, if the minimum frame rate in the current shooting scenario is min_fps=30 fps, the exposure meter B obtained by updating the exposure meter A based on min_fps may be shown in Table 4.

TABLE 4

| | Minimum exposure time (ns) | Maximum exposure time (ns) | Minimum gain | Maximum gain |
|---|---|---|---|---|
| 1 | 8,355,660 | 8,355,660 | 1,000 | 1,000 |
| 2 | 8,355,660 | 16,652,060 | 1,000 | 12,000 |
| 3 | 16,652,060 | 16,652,060 | 12,000 | 32,000 |
| 4 | 16,652,060 | 33,304,120 | 32,000 | 128,000 |

A maximum exposure time of data in group 4 in Table 4 is modified from 60,000,000 to U.S. Pat. No. 33,304,120, to enable a maximum exposure time in Table 4 to be less than or equal to 1/min_fps (that is, all exposure times in Table 4 are less than or equal to 1/min_fps). This avoids a low frame rate.

The following describes a process in which the exposure meter decision-making engine corrects the exposure meter B to obtain the exposure meter C based on the photosensitivity of the camera lens (the camera lens corresponding to the current shooting scenario).

The exposure meter decision-making engine may add a group of pieces of exposure data to the exposure meter B, to obtain the exposure meter C. If a maximum exposure time in a last group of data in the exposure meter B is equal to 1/frame rate, a minimum exposure time and a maximum exposure time in the added group of pieces of exposure data are the same as a maximum exposure time in a previous group of data (for example, the last group of data in the exposure meter B). If a maximum exposure time in a last group of data in the exposure meter B is less than 1/frame rate, a minimum exposure time in the added group of pieces of exposure data is the same as a maximum exposure time in a previous group of data (for example, the last group of data in the exposure meter B) (to maintain continuity of the exposure time), where the maximum exposure time=1/frame rate. A minimum gain in the added group of pieces of exposure data may be the same as a maximum gain in the previous group of pieces of exposure data (to maintain continuity of the gain), and a maximum gain may be maxISO, where maxISO=min (maxISOOrg, Ratio*the maximum gain in the previous group of pieces of exposure data). maxISOOrg represents a maximum gain of a current camera lens set by a PQ, and ratio=now_binSumRatio (the photosensitivity of the camera lens in the current shooting scenario)/max_binSumRatio (maximum photosensitivity).

For example, if the photosensitivity of the camera lens is reduced by half, an exposure meter C obtained after updating the exposure meter B based on the photosensitivity of the camera lens may be shown in Table 5.

TABLE 5

| | Minimum exposure time (ns) | Maximum exposure time (ns) | Minimum gain | Maximum gain |
|---|---|---|---|---|
| 1 | 8,355,660 | 8,355,660 | 1,000 | 1,000 |
| 2 | 8,355,660 | 16,652,060 | 1,000 | 12,000 |
| 3 | 16,652,060 | 16,652,060 | 12,000 | 32,000 |
| 4 | 16,652,060 | 33,304,120 | 32,000 | 128,000 |
| 5 | 33,304,120 | 33,304,120 | 128,000 | maxISO |

As shown in Table 5, a group of data (for example, group 5 of data) may be added without changing a gain (a maximum gain and a minimum gain) of each group of data in the exposure meter B (that is, Table 4). In the added exposure data (group 5 of exposure data), a maximum exposure time and a minimum exposure time are the same as a maximum exposure time of a previous group of pieces of exposure data (group 4 of exposure data), and a minimum gain is the same as a maximum gain of the previous group of pieces of exposure data. The maximum gain is maxISO, where maxISO=min (maxISOOrg, Ratio*128,000).

Because the different sensormode is corresponding to the different photosensitivity, when the camera lens is switched to the sensormode, the photosensitivity is changed while the sensormode is changed.

Figure 6:
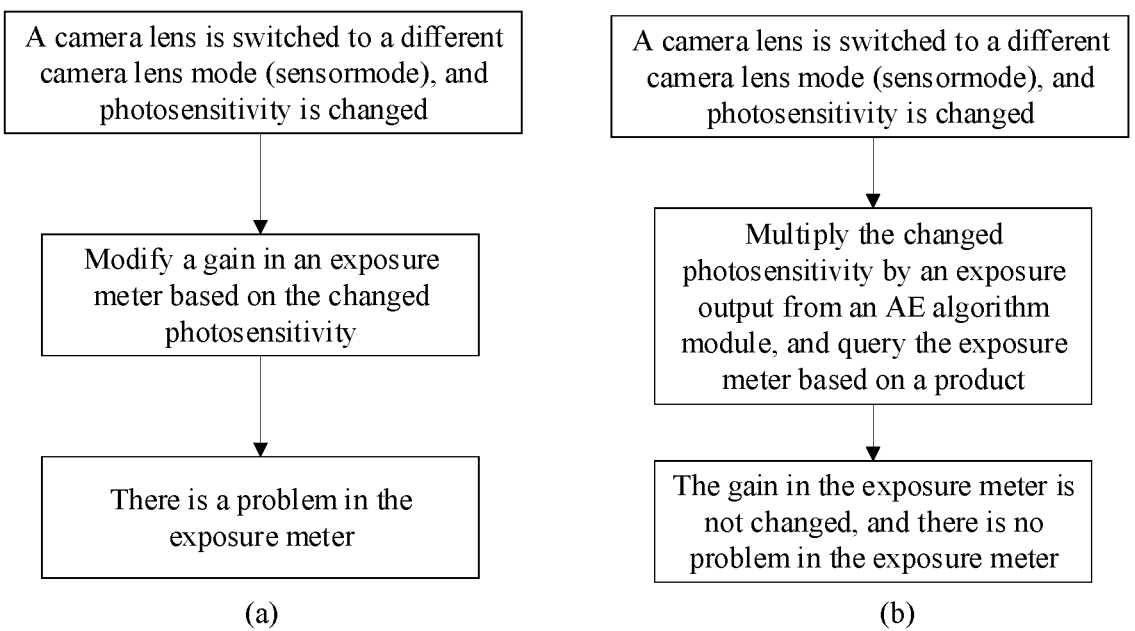
FIG. 6 is a schematic diagram of another adjustment of an exposure meter according to an embodiment of this application.

As shown in (a) in FIG. 6, in a conventional technology, when the camera lens is switched to the sensormode and the photosensitivity is changed, a difference in the photosensitivity is synchronized based on a gain, and all minimum gains and maximum gains of the exposure meter are changed. This is inconsistent with an expectation of debugging by the PQ. As shown in (b) in FIG. 6, in this application, when the camera lens is switched to the sensormode and the photosensitivity is changed, a difference in photosensitivity may be synchronized based on an exposure, the changed photosensitivity is multiplied by an exposure outputted by the exposure decision-making module, and the corrected exposure meter is queried based on the product (that is, a product of new photosensitivity and the exposure outputted by the exposure decision-making module). The corrected exposure meter does not change raw data of the initial exposure meter (especially the gain is unchanged). Only a group of data is added, and a debugging interval of the exposure meter is not smaller (unchanged or larger). In addition, the corrected exposure meter does not affect an exposure time and an exposure gain in a high brightness scenario. In a low-brightness scenario, to ensure consistency of brightness, although an increase in a gain causes an increase in noise, the noise may be reduced by debugging.

In some embodiments, the exposure meter decision-making engine may establish an exposure meter corresponding to each camera lens based on maximum photosensitivity of each camera lens, and synchronize, based on the exposure meter that is established based on the maximum photosensitivity, an exposure parameter of the camera lens with different photosensitivity. Therefore, the exposure meter is not separately set based on the different photosensitivity of the camera lens. This simplifies work of the PQ.

In some embodiments, the exposure meter decision-making engine may separately correct the initial exposure meter, based on parameters such as the minimum frame rate in the current shooting scenario, photosensitivity of the sensor, and the flicker frequency of the flicker light source, to obtain the corrected (updated) exposure meter. For example, the exposure meter decision-making engine may modify the initial exposure meter based on the frequency of the flicker light source, to obtain the exposure meter A. The exposure meter A is the corrected (updated) exposure meter. For another example, the exposure meter decision-making engine may correct the initial exposure meter based on the minimum frame rate in the current shooting scenario, to obtain an exposure meter G. The exposure meter G is the corrected exposure meter. For another example, the exposure meter decision-making engine may correct the initial exposure meter based on the photosensitivity of the camera lens, to obtain an exposure meter H. The exposure meter H is the corrected exposure meter.

In some embodiments, the exposure meter decision-making engine may determine the exposure parameter based on a motion speed of an object shot in the current shooting scenario. For example, when the exposure meter decision-making engine determines that the motion speed of the object shot in the current shooting scenario is greater than a preset threshold, the exposure parameter decision-making module may select, based on a specific exposure, an exposure parameter with a lower exposure time and a higher gain. In this way, the electronic device supports reducing exposure during movement, to enable an image obtained by the electronic device in a motion (motion) scenario is clearer.

In some embodiments, the exposure meter decision-making engine may obtain a control identifier issued by an upper layer (for example, the application layer). The control identifier sent from the upper layer may include shooting mode information (for example, a professional mode) and a priority identifier. The priority identifier may include, for example, a shutter priority identifier and an iso priority identifier. The shutter priority identifier is used to preferentially adjust brightness by adjusting the shutter, and the gain is essentially unchanged. The iso priority identifier is used to preferentially adjust the brightness by adjusting the gain, and the shutter is unchanged. When the exposure meter decision-making engine obtains the control identifier sent from the upper layer, the exposure parameter may be adjusted based on the control identifier sent from the upper layer.

413: The exposure parameter decision-making module obtains the exposure from the exposure decision-making module, obtains the corrected exposure meter from the exposure meter decision-making engine, and queries the corrected exposure meter based on the exposure to determine the exposure parameter (the exposure time and the exposure gain) of the camera lens (the camera lens corresponding to the current shooting scenario).

For example, if the current shooting scenario is a face recognition scenario, and the camera lens corresponding to the face recognition scenario is a front-facing camera lens (the first camera lens), the exposure parameter decision-making module may obtain the exposure of the front-facing camera lens from the exposure decision-making module, and query the corrected exposure meter (an exposure meter that is obtained after the exposure meter decision-making engine corrects an initial exposure meter (the first exposure meter) corresponding to the front-facing camera lens in the face recognition scenario, that is a second exposure meter) based on the exposure of the front-facing camera lens, to determine the exposure parameter (the exposure time and the exposure gain) of the front-facing camera lens.

For another example, if the current shooting scenario is a multi-lens shooting scenario, and a camera lens corresponding to the multi-lens shooting scenario includes at least one camera lens (a front-facing camera lens and a rear-facing camera lens), the exposure parameter decision-making module may separately obtain exposures of the front-facing camera lens and the rear-facing camera lens from the exposure decision-making module, and query the corrected exposure meter (an exposure meter that is obtained after the exposure meter decision-making engine corrects an initial exposure meter corresponding to the front-facing camera lens in the multi-lens shooting scenario) based on the exposure of the front-facing camera lens, to determine the exposure parameter (the exposure time and the exposure gain) of the front-facing camera lens, and query the corrected exposure meter (an exposure meter is obtained after the exposure meter decision-making engine corrects the initial exposure meter corresponding to the rear-facing camera lens in the multi-lens shooting scenario) based on the exposure of the rear-facing camera lens, to determine the exposure parameter (the exposure time and the exposure gain) of the rear-facing camera lens.

414: The exposure parameter decision-making module sends the exposure parameter of the camera lens corresponding to the current shooting scenario to a corresponding camera lens driver module.

For example, if the current shooting scenario is the face recognition scenario, and a camera lens corresponding to the face recognition scenario is the front-facing camera lens (the first camera lens), the selected exposure parameter (the exposure time and the exposure gain) of the front-facing camera lens may be sent to a camera lens driver module of the front-facing camera lens.

For another example, if the current shooting scenario is a rear-facing portrait scenario, and a camera lens corresponding to the rear-facing portrait scenario is the rear-facing camera lens, the determined exposure parameter of the rear-facing camera lens may be sent to a camera lens driver module of the rear-facing camera lens.

For another example, if the current shooting scenario is the multi-lens shooting scenario, the camera lens corresponding to the multi-lens shooting scenario includes at least one camera lens (the front-facing camera lens and the rear-facing camera lens), and the determined exposure parameter of the front-facing camera lens (the first camera lens) and the rear-facing camera lens (the second camera lens) may be sent to the camera lens driver modules of the front-facing camera lens and the rear-facing camera lens.

415: The corresponding camera lens driver module sets the exposure parameter of the corresponding camera lens.

The camera lens driver module writes the exposure parameter of the camera lens into a register of the camera lens. For example, the camera lens driver module may write the exposure parameter into the register of the camera lens via an inter-integrated circuit (inter-integrated circuit, I2C) bus. The camera lens may acquire image data based on a corresponding exposure parameter.

In the method provided in embodiments of this application, the initial exposure meter corresponding to the camera lens in the current shooting scenario can be corrected, specifically, the first exposure meter can be corrected based on at least one of the minimum frame rate in the current shooting scenario, the photosensitivity of the first camera lens, and the flicker frequency of the ambient light source, to obtain the second exposure meter, and the first exposure meter can be corrected based on the minimum frame rate in the current shooting scenario, to avoid the low frame rate. The first exposure meter can be corrected based on the flicker frequency of the ambient light source, to avoid screen flickering. The first exposure meter can be corrected based on the photosensitivity of the first camera lens without reducing the debugging interval of the first exposure meter, to ensure the consistency of the brightness.

Some embodiments of this application provide an electronic device, and the electronic device may include: a touch screen, a memory, and one or more processors. The touch screen and the memory are coupled to the processor. The memory is configured to store computer program code. The computer program code includes computer instructions. When the processor executes the computer instructions, the electronic device may perform functions or steps performed by the electronic device in the foregoing method embodiments. For a structure of the electronic device, refer to the structure of the electronic device 100 shown in FIG. 1.

Figure 7:
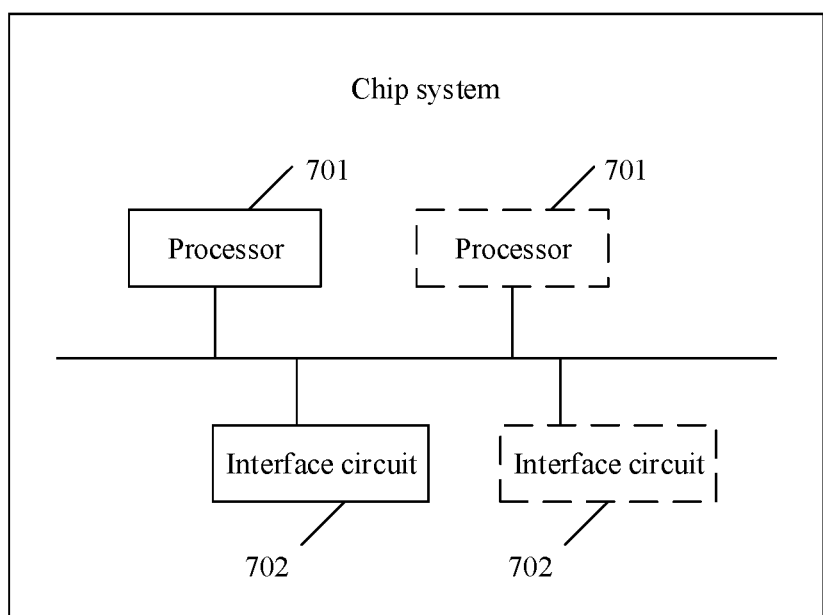
FIG. 7 is a schematic structural diagram of a chip system according to an embodiment of this application.

An embodiment of this application further provides a chip system (for example, a system on a chip (system on a chip, SoC)). As shown in FIG. 7, the chip system includes at least one processor 701 and at least one interface circuit 702. The processor 701 and the interface circuit 702 may be connected to each other through a line. For example, the interface circuit 702 may be configured to receive a signal from another apparatus (for example, a memory of an electronic device). For another example, the interface circuit 702 may be configured to send a signal to another apparatus (for example, the processor 701 or a touchscreen of the electronic device). For example, the interface circuit 702 may read instructions stored in the memory, and send the instructions to the processor 701. When the instructions are executed by the processor 701, the electronic device is enabled to perform the steps in the foregoing embodiments. Certainly, the chip system may further include another discrete device. This is not specifically limited in this embodiment of this application.

An embodiment of this application further provides a computer-readable storage medium. The computer-readable storage medium includes computer instructions. When the computer instructions run on an electronic device, the electronic device is enabled to perform the functions or steps performed by the electronic device in the foregoing method embodiment.

Based on the descriptions of the foregoing implementations, a person skilled in the art may clearly understand that, for a purpose of convenient and brief description, division into the foregoing functional modules is merely used as an example for illustration. In actual application, the foregoing functions may be allocated to different functional modules and implemented based on a requirement. In other words, an inner structure of the apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division and may be another division in actual implementation. For example, a plurality of units or components may be combined or integrated into another apparatus, or some features may be ignored or not performed. In addition, the displayed or discussed mutual couplings, direct couplings, or communication connections may be implemented by using some interfaces. The indirect couplings or communication connections between the apparatuses or units may be implemented in an electronic, mechanical, or another form.

The units described as separate parts may or may not be physically separated. A part displayed as a unit may be one or more physical units, that is, may be located at the one position, or may be distributed to different positions. Some or all of the units may be selected according to actual needs to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions of embodiments of this application essentially, or the part contributing to the related art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing content is merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for determining an exposure parameter, applied to an electronic device, wherein the electronic device comprises a plurality of camera lenses, and the method comprises:

identifying a current shooting scenario, and determining at least one camera lens corresponding to the current shooting scenario, wherein the at least one camera lens comprises a first camera lens, the first camera lens is corresponding to a first exposure meter, and the first exposure meter is preset, and wherein the first exposure meter includes a plurality of groups of data, and each group of data includes a minimum exposure time, a maximum exposure time, a minimum gain, and a maximum gain;

adjusting the first exposure meter based on a first parameter, to obtain a second exposure meter, wherein the first parameter comprises a minimum frame rate in the current shooting scenario, photosensitivity of the first camera lens, and a flicker frequency of an ambient light source, and wherein adjusting the first exposure meter based on the first parameter, to obtain the second exposure meter comprises:

updating a maximum exposure time in the first exposure meter to 1/Z based on a minimum frame rate Z in the current shooting scenario, to obtain a third exposure meter;

modifying all exposure times in the third exposure meter to an integer multiple of the flicker frequency of the ambient light source based on the flicker frequency of the ambient light source, to obtain a fourth exposure meter; and adding a group of pieces of exposure data to the fourth exposure meter, to obtain the second exposure meter, wherein the added group of pieces of exposure data comprises at least one of a maximum exposure time, a minimum exposure time, a maximum exposure gain, and a minimum exposure gain, the minimum exposure time is the same as an exposure time with a maximum value in the fourth exposure meter, the maximum exposure time is 1/frame rate, the minimum exposure gain is the same as an exposure gain with a maximum value in the fourth exposure meter, and the maximum exposure gain is determined based on a maximum exposure gain corresponding to the first camera lens, the exposure gain with a maximum value in the fourth exposure meter, current photosensitivity of the first camera lens, and maximum photosensitivity of the first camera lens; and determining an exposure parameter of the first camera lens based on the second exposure meter, and controlling, based on the exposure parameter, the first camera lens to acquire image data, wherein the exposure parameter comprises an exposure time and an exposure gain.

2. The method according to claim 1, wherein $$\text{maxISO}=\min(\text{maxISOOrg},(\text{now\_binSumRatio}/\text{max\_binSumRatio})*X),$$

wherein maxISO represents the maximum exposure gain in the added group of pieces of exposure data, maxISOOrg represents the maximum exposure gain corresponding to the first camera lens, now_binSumRatio represents photosensitivity of the first camera lens in the current shooting scenario, max_binSumRatio represents the maximum photosensitivity of the first camera lens, and X represents the exposure gain with a maximum value in the fourth exposure meter.

3. The method according to claim 1, wherein the determining an exposure parameter of the first camera lens based on the second exposure meter comprises:

when the photosensitivity of the first camera lens is changed, querying the second exposure meter based on a product of the changed photosensitivity and exposure, to obtain the exposure parameter of the first camera lens.

4. The method according to claim 1, comprising:

establishing an exposure meter corresponding to the first camera lens based on the maximum photosensitivity of the first camera lens.

5. The method according to claim 1, wherein the added group of pieces of exposure data comprises the maximum exposure time, the minimum exposure time, the maximum exposure gain, and the minimum exposure gain.

6. The method according to claim 1, wherein the added group of pieces of exposure data comprises the maximum exposure time and the minimum exposure time.

7. The method according to claim 1, wherein the added group of pieces of exposure data comprises the maximum exposure gain, and the minimum exposure gain.

8. An electronic device, wherein the electronic device comprises: a wireless communication module, memory, and one or more processors, and the wireless communication module and the memory are coupled to the one or more processors; and the memory stores computer program code, the computer program code comprises computer instructions, and when the computer instructions are executed by the one or more processors, the electronic device is enabled to:

identify a current shooting scenario, and determine at least one camera lens corresponding to the current shooting scenario, wherein the at least one camera lens comprises a first camera lens, the first camera lens corresponds to a first exposure meter, and the first exposure meter is preset, and wherein the first exposure meter includes a plurality of groups of data, and each group of data includes a minimum exposure time, a maximum exposure time, a minimum gain, and a maximum gain;

adjust the first exposure meter based on a first parameter, to obtain a second exposure meter, wherein the first parameter comprises a minimum frame rate in the current shooting scenario, photosensitivity of the first camera lens, and a flicker frequency of an ambient light source, and wherein adjusting the first exposure meter based on the first parameter, to obtain the second exposure meter comprises:

updating a maximum exposure time in the first exposure meter to 1/Z based on a minimum frame rate Z in the current shooting scenario, to obtain a third exposure meter;

modifying all exposure times in the third exposure meter to an integer multiple of the flicker frequency of the ambient light source based on the flicker frequency of the ambient light source, to obtain a fourth exposure meter; and adding a group of pieces of exposure data to the fourth exposure meter, to obtain the second exposure meter, wherein the added group of pieces of exposure data comprises at least one of a maximum exposure time, a minimum exposure time, a maximum exposure gain, and a minimum exposure gain, the minimum exposure time is the same as an exposure time with a maximum value in the fourth exposure meter, the maximum exposure time is 1/frame rate, the minimum exposure gain is the same as an exposure gain with a maximum value in the fourth exposure meter, and the maximum exposure gain is determined based on a maximum exposure gain corresponding to the first camera lens, the exposure gain with a maximum value in the fourth exposure meter, current photosensitivity of the first camera lens, and maximum photosensitivity of the first camera lens; and determine an exposure parameter of the first camera lens based on the second exposure meter, and control, based on the exposure parameter, the first camera lens to acquire image data, wherein the exposure parameter comprises an exposure time and an exposure gain.

9. The electronic device according to claim 8, wherein $$maxISO=min(maxISOOrg,(now\_binSumRatio/max\_binSumRatio)*X),$$

wherein maxISO represents the maximum exposure gain in the added group of pieces of exposure data, maxISOOrg represents the maximum exposure gain corresponding to the first camera lens, now_binSumRatio represents photosensitivity of the first camera lens in the current shooting scenario, max_binSumRatio represents the maximum photosensitivity of the first camera lens, and X represents the exposure gain with a maximum value in the fourth exposure meter.

10. The electronic device according to claim 8, wherein determining the exposure parameter of the first camera lens based on the second exposure meter comprises:

when the photosensitivity of the first camera lens is changed, querying the second exposure meter based on a product of the changed photosensitivity and exposure, to obtain the exposure parameter of the first camera lens.

11. The electronic device according to claim 8, wherein when the computer instructions are executed by the one or more processors, the electronic device is enabled to:

establishing an exposure meter corresponding to the first camera lens based on the maximum photosensitivity of the first camera lens.

12. The electronic device according to claim 8, wherein the added group of pieces of exposure data comprises the maximum exposure time, the minimum exposure time, the maximum exposure gain, and the minimum exposure gain.

13. The electronic device according to claim 8, wherein the added group of pieces of exposure data comprises the maximum exposure time and the minimum exposure time.

14. The electronic device according to claim 8, wherein the added group of pieces of exposure data comprises the maximum exposure gain, and the minimum exposure gain.

15. A non-transitory computer-readable storage medium, comprising computer instructions, wherein when the computer instructions are run on an electronic device, the electronic device is enabled to:

identify a current shooting scenario, and determine at least one camera lens corresponding to the current shooting scenario, wherein the at least one camera lens comprises a first camera lens, the first camera lens corresponds to a first exposure meter, and the first exposure meter is preset, and wherein the first exposure meter includes a plurality of groups of data, and each group of data includes a minimum exposure time, a maximum exposure time, a minimum gain, and a maximum gain;

adjust the first exposure meter based on a first parameter, to obtain a second exposure meter, wherein the first parameter comprises a minimum frame rate in the current shooting scenario, photosensitivity of the first camera lens, and a flicker frequency of an ambient light source, and wherein adjusting the first exposure meter based on the first parameter, to obtain the second exposure meter comprises:

updating a maximum exposure time in the first exposure meter to 1/Z based on a minimum frame rate Z in the current shooting scenario, to obtain a third exposure meter;

modifying all exposure times in the third exposure meter to an integer multiple of the flicker frequency of the ambient light source based on the flicker frequency of the ambient light source, to obtain a fourth exposure meter; and adding a group of pieces of exposure data to the fourth exposure meter, to obtain the second exposure meter, wherein the added group of pieces of exposure data comprises at least one of a maximum exposure time, a minimum exposure time, a maximum exposure gain, and a minimum exposure gain, the minimum exposure time is the same as an exposure time with a maximum value in the fourth exposure meter, the maximum exposure time is 1/frame rate, the minimum exposure gain is the same as an exposure gain with a maximum value in the fourth exposure meter, and the maximum exposure gain is determined based on a maximum exposure gain corresponding to the first camera lens, the exposure gain with a maximum value in the fourth exposure meter, current photosensitivity of the first camera lens, and maximum photosensitivity of the first camera lens; and determine an exposure parameter of the first camera lens based on the second exposure meter, and control, based on the exposure parameter, the first camera lens to acquire image data, wherein the exposure parameter comprises an exposure time and an exposure gain.

16. The non-transitory computer-readable storage medium according to claim 15, wherein $$maxISO=min(maxISOOrg,(now\_binSumRatio/max\_binSumRatio)*X),$$

wherein maxISO represents the maximum exposure gain in the added group of pieces of exposure data, maxISOOrg represents the maximum exposure gain corresponding to the first camera lens, now_binSumRatio represents photosensitivity of the first camera lens in the current shooting scenario, max_binSumRatio represents the maximum photosensitivity of the first camera lens, and X represents the exposure gain with a maximum value in the fourth exposure meter.

17. The non-transitory computer-readable storage medium according to claim 15, wherein determining the exposure parameter of the first camera lens based on the second exposure meter comprises:

when the photosensitivity of the first camera lens is changed, querying the second exposure meter based on a product of the changed photosensitivity and exposure, to obtain the exposure parameter of the first camera lens.

18. The non-transitory computer-readable storage medium according to claim 15, wherein when the computer instructions are run on the electronic device, the electronic device is enabled to:

establish an exposure meter corresponding to the first camera lens based on the maximum photosensitivity of the first camera lens.

19. The non-transitory computer-readable storage medium according to claim 15, wherein the added group of pieces of exposure data comprises the maximum exposure time, the minimum exposure time, the maximum exposure gain, and the minimum exposure gain.

20. The non-transitory computer-readable storage medium according to claim 15, wherein the added group of pieces of exposure data comprises the maximum exposure time and the minimum exposure time.

* * * * *